United States Patent
Chyo et al.

(10) Patent No.: US 8,006,675 B2
(45) Date of Patent: Aug. 30, 2011

(54) DIESEL FUEL COOLING SYSTEM AND CONTROL STRATEGY

(75) Inventors: Timothy Chyo, Dearborn, MI (US); Peter Kanefsky, West Bloomfield, MI (US); Carlos Armesto, Canton, MI (US); Anil Shah, Canton, MI (US); Douglas Schoen, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/914,913

(22) Filed: Oct. 28, 2010

(65) Prior Publication Data
US 2011/0041812 A1 Feb. 24, 2011

Related U.S. Application Data

(62) Division of application No. 11/677,004, filed on Feb. 20, 2007, now Pat. No. 7,836,867.

(51) Int. Cl.
*F02M 37/04* (2006.01)
(52) U.S. Cl. ........................................ 123/541; 123/514
(58) Field of Classification Search .................. 123/541, 123/514
See application file for complete search history.

(56) References Cited

U.S. PATENT DOCUMENTS

| | | | |
|---|---|---|---|
| 4,872,438 A | 10/1989 | Ausiello et al. | |
| 4,924,838 A * | 5/1990 | McCandless | 123/541 |
| 5,794,598 A * | 8/1998 | Janik et al. | 123/514 |
| 5,964,206 A | 10/1999 | White et al. | |
| 5,975,032 A * | 11/1999 | Iwata | 123/41.31 |
| 5,988,265 A | 11/1999 | Marthaler | |
| 6,006,729 A * | 12/1999 | Aoyama | 123/541 |
| 6,230,692 B1 | 5/2001 | Thompson | |
| 6,269,804 B1 | 8/2001 | Braun et al. | |
| 6,457,460 B1 | 10/2002 | Doane et al. | |
| 6,626,162 B2 | 9/2003 | Shelor et al. | |
| 6,868,838 B2 | 3/2005 | Piet | |
| 7,150,270 B2 * | 12/2006 | Hoffmann et al. | 123/514 |
| 2006/0249129 A1 | 11/2006 | Ozdemir | |

FOREIGN PATENT DOCUMENTS

| | | |
|---|---|---|
| DE | 19712479 A1 | 10/1998 |
| JP | 09-242624 | 9/1997 |
| JP | 2006-037864 A | 2/2006 |

* cited by examiner

*Primary Examiner* — M. McMahon
(74) *Attorney, Agent, or Firm* — Julia Voutyras; Alleman Hall McCoy Russell & Tuttle LLP

(57) ABSTRACT

A method is described for cooling fuel for a diesel engine system with a common rail fuel injection system having a coolant pump and a fan. The method comprises passing a returning fuel from the engine through a fuel to coolant heat exchange system to cool the fuel, and adjusting the cooling of the fuel by controlling the coolant pump and/or the engine cooling fan.

9 Claims, 6 Drawing Sheets

DIESEL FUEL COOLING SYSTEM AND CONTROL STRATEGY

CROSS REFERENCE TO RELATED APPLICATIONS

The present application is a divisional of U.S. patent application Ser. No. 11/677,004 filed Feb. 20, 2007, the entire contents of which are incorporated herein by reference.

BACKGROUND AND SUMMARY

Common rail diesel fuel injection systems have enable diesel engines to operate with increased fuel efficiency, reduced noise, and reduced emissions. The common rail diesel injection system first pressurizes fuel under high pressure in a central accumulator rail and then delivers it to the individual electronically-controlled injection valves/injectors. The pressurized fuel is used for combustion and injector operation. In addition, fuel is also used to cool and lubricate the pumping apparatus. This provides high injection pressures, in some cases over 25,000 psi, across a wide range of operating conditions. The common rail injection system may allow up to 5 injections per engine cycle. However, one issue associated with the common rail fuel injection system is the amount of heat added to the fuel not used for combustion. The unburned/return fuel temperature can reach up to 140° C., for example. The elevated fuel temperature may cause deterioration of the fuel pump efficiency and durability, degradation of plastics and elastomers, and require hydrocarbon traps in the fuel system. Various cooling systems may be used to cool the returning fuel to address the above issues.

One such fuel cooling system for diesel injection system is described in U.S. Pat. No. 6,868,838. This system includes two cooling devices for cooling un-injected fuel returning from the common rail fuel injection system to the fuel tank. The first cooling device (a water/fuel exchanger) is positioned downstream of the engine; and the second cooling device (an air/fuel exchanger) is positioned downstream of the first cooling device. A control device controls the position of the various valves in the cooling system to determine the returning fuel flow route. The returning fuel can either pass through or bypass any one of the cooling devices depending on the valve positions. This results in various degrees of fuel cooling. The control device controls the valve based on the ambient temperature and the engine speed. For example, at a low ambient temperature, on the order of −20° C., and a medium engine speed, since no cooling of the fuel is required, the control unit directs the valves to be in such positions that returning fuel bypasses both cooling devices. Likewise, at a very high exterior temperature, on the order of 80° C., and high engine speed, since maximum cooling of the returning fuel is needed, the control unit directs the valves to be in such positions that the returning fuel passes through both cooling devices. Further, at a hot ambient temperature, on the order of 40° C., and a low engine speed, since moderate cooling of the returning fuel is needed, the control unit directs the valves to be in such positions that the returning fuel bypasses the first cooling device but passes through the second cooling device.

However, the inventors herein have recognized several issues with the above approach. For example, the use of two cooling devices in combination with multiple control valves may increase a likelihood of mechanical or electrical degradation of the system, and thus during some conditions inadequate cooling may result. Further, it may be difficult to control the returning fuel temperature with sufficient accuracy through coordination of the different valve positions.

The inventors herein have recognized that such issues may be at least partially addressed by providing a fuel cooling system for a diesel engine system having a set of internal combustion cylinders, a fuel storage tank, and a common rail fuel injection system which comprises (1) a fuel distribution circuit for carrying fuel from the fuel storage tank to the common rail fuel injection system to be injected into the engine cylinders; (2) a fuel recycling circuit for carrying un-injected fuel returning from the common rail fuel injection system back to the fuel storage tank; (3) a temperature sensor for sensing fuel temperature; (4) a fuel to coolant heat exchange system for cooling the fuel wherein the fuel to coolant heat exchange system comprises a coolant reservoir, an electric coolant pump, and a heat exchanger; (5) a mechanism for controlling the electric coolant pump operation; (6) an air to coolant heat exchange system coupled to the fuel to coolant heat exchange system for cooling the coolant in the fuel to coolant heat exchange system wherein the air to coolant heat exchanger system is exposed to vehicle ram air and includes a heat exchanger and a cooling fan; (7) and a mechanism for controlling the cooling fan.

In some embodiments, the control mechanisms for controlling the coolant pump and the cooling fan may be provided by a control system, such as an engine control unit, where control of the pump and cooling fan may vary with operating conditions of the vehicle.

In some embodiments, it is possible the fuel cooing system may contain a routine for performing temperature sensor diagnostics. In some other embodiments, the fuel cooling system may further be able to switch to a temperature sensor degradation strategy for controlling the coolant pump and/or for controlling the cooling fan in case the temperature sensor is not working properly.

By providing both an air to coolant heat exchange system in addition to a fuel to coolant heat exchange system, the fuel cooling system may achieve additional cooling that may not be possible through a fuel to coolant heat exchange system alone. Further, by coordinating control of the cooling fan and cooling pump, appropriate cooling can be tailored to the vehicle operating conditions to achieve improved fuel cooling and performance. For example, the fuel cooling system may provide an supplemental cooling when the vehicle ram air is not sufficient, for example when the vehicle is operating at an lower engine speed or when the vehicle ram air is impeded by for example a physical block.

Finally, by providing a fuel temperature sensor degradation strategy, the fuel cooling system may reduce fuel system shut-downs and provide necessary cooling even when the fuel temperature sensor degrades.

DETAILED DESCRIPTION

Figure 1:
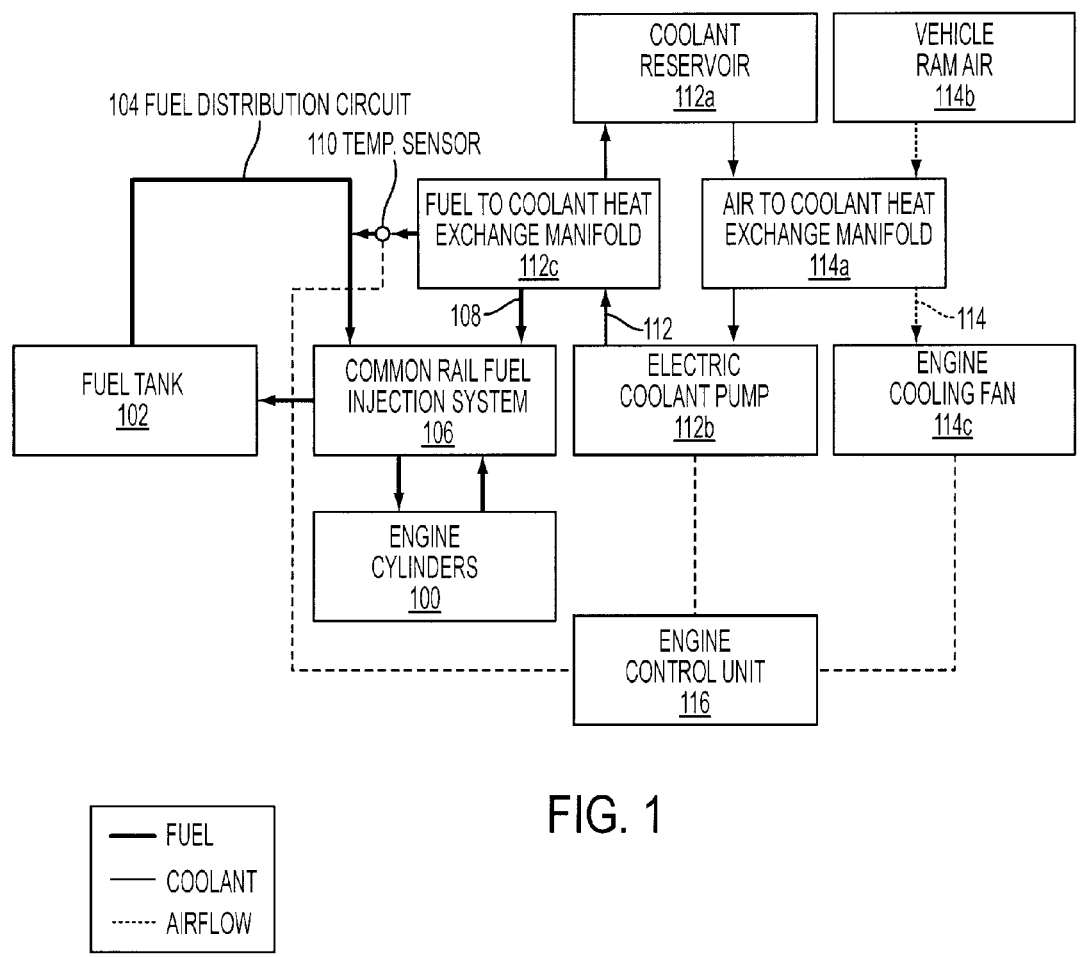
FIG. 1 is a system diagram of an example fuel cooling system.

FIG. 1 shows an example fuel cooling system for a diesel engine system having a set of internal combustion engine cylinders 100; a fuel storage tank 102 for storing fuel; a fuel distribution circuit 104, a common rail fuel injection system 106, a fuel recycling circuit 108, a temperature sensor 110, a fuel to coolant heat exchange system 112, an air to coolant heat exchange system 114, an engine control unit 116, pressure sensors 118, various sensors 120, and various actuators 122.

In this example embodiment, the fuel flows out of the fuel storage tank 102, passes through the fuel distribution circuit 104, and passes through the common rail fuel injection system 106. From the common rail fuel injection system 106, the fuel then flows into the engine cylinders 100 to be injected via injectors (not shown). The un-injected fuel travels from the common rail fuel injection system 106, passing through the fuel recycling circuit 108, and then back to the fuel storage tank 102. The fuel to coolant heat exchange system 112 is positioned in the path of the fuel recycling circuit 108 for cooling the un-injected fuel returning to the fuel storage tank 102 and is coupled to and cooled by the air to coolant heat exchange system 114.

The temperature sensor 110 is positioned in the path of the fuel recycling circuit 108 for sensing fuel temperature. The pressure sensors 118 are positioned in the fuel distribution circuit 104 and the common rail fuel injection system 106. The engine control unit 116 is coupled to the temperature sensor 110, pressure sensors 118, the fuel to coolant heat exchange system 112, the air to coolant heat exchange system 114, and to various other sensors 120 and actuators 122 (not shown) In this embodiment, still referring to FIG. 1, the fuel storage tank 102 has a first opening which provides a passage for fuel in the fuel storage tank 102 to flow into the low pressure fuel line 104b of the fuel distribution circuit 104; has a second opening which provides a passage for fuel returning from the back flow fuel line 108a of the fuel recycling circuit 108.

Although the fuel storage tank 102 may have an opening for receiving the un-injected fuel from the common rail fuel injection system 106 through the fuel recycling circuit 108, it is possible in other embodiments the fuel flow path is such that the un-injected fuel does not return back to the fuel storage tank, for example, the un-injected fuel instead may be recycled directly back to the common rail fuel injection system 106. Also, the fuel storage tank may have an opening and/or a mechanism for receiving excess fuel back from the fuel distribution circuit, for example, when the engine is idling or is operating at a low speed so that the fuel delivered from the fuel storage tank 102 to the fuel distribution circuit 104 is excessive to what is required to drive the engine cylinders. In this way, the fuel is re-circulated back to the fuel storage tank 102 from the fuel distribution circuit 104 through, for example, a pressure regulator.

The fuel distribution circuit 104 includes a low pressure fuel pump 104a for pumping fuel out of the fuel storage tank 102; a low pressure fuel line 104b for carrying low pressure fuel coming out of the fuel storage tank 102; and a fuel filter 104c positioned in the path of the low pressure fuel line 104b for filtering the fuel. As mentioned before, in some embodiments, it is possible for the fuel distribution circuit 104 to have a mechanism to return excessive fuel back to the fuel storage tank 102. It may also be possible in some embodiments for the fuel distribution circuit 104 to include various pumps, filters, regulators, bypasses, valves, meters, sensors, controls, actuators, etc.

The common rail fuel injection system 106 is coupled on one end to the fuel distribution circuit 104 and on the other end to the engine cylinders 100 and the fuel recycling circuit 108. Injection system 106 includes a high pressure fuel pump 106a for pressurizing the fuel in the common rail fuel injection system 106 and a high pressure fuel line 106b for carrying the pressurized fuel to a common rail 106c in which the pressurized fuel is to be stored. Injection system 106 also includes a pressure regulator 106d, which is positioned between the high pressure fuel 106b and the backflow fuel line 108a for adjusting the fuel pressure in the high pressure fuel line 106b. Further, the common rail fuel injection system 106 includes fuel injectors 106e for injecting pressurized fuel into the engine cylinders 100. It is also possible to have other configurations of the common rail fuel injection system 106. For example, the common rail fuel injection system may include additional pressure and/or temperature sensors for sensing fuel pressure and temperature, may include additional pressure regulators for controlling the fuel pressure, and may include mechanisms for controlling fuel injection into the engine cylinders.

The fuel recycling circuit 108 receives un-injected fuel from the fuel injector 106e and returns the un-injected returning fuel back into the fuel storage tank 102. Fuel recycling circuit 108 also includes a fuel back flow line 108a for carrying the un-injected fuel. The fuel recycling circuit 108 is further coupled to the high pressure fuel line 106b of the fuel distribution circuit 106 via a pressure regulator 106d. The pressure regulator 106d may include one or more valves/mechanisms for fuel in the high pressure fuel line 106b to flow to the back flow fuel line 108a under certain conditions. For example, when the fuel pressure is too high in the high pressure fuel line 106b, the valves/mechanisms of the pressure regulator 106d will allow the fuel to flow from the high pressure fuel line 106b to the back flow fuel line 108a.

Although in this embodiment there is only one line, the back flow fuel line 108a, provided for the fuel recycling circuit, multiple lines may be provided. Also, the recycling circuit may be configured in such a way that it may receive recycling fuel from the fuel distribution circuit 104, for example. It is also possible, as mentioned before in reference to the fuel storage tank configuration, that the fuel recycling circuit 108 may not serve to return the un-injected fuel back from the common rail fuel injection system 106 to the fuel storage tank 102, but instead the fuel recycling circuit 108 serves to recycle the un-injected fuel directly back to the common rail fuel injection system 106. Further still, the fuel recycling circuit 108 may serve to return part of the un-injected fuel back to the fuel storage tank 102, and the other part of the un-injected fuel directly back to the common rail fuel injection system 106.

The fuel to coolant heat exchange system 112 may be positioned in the path of the fuel back flow line 108a of the fuel recycling circuit 108 for cooling the returning fuel from the common rail fuel injection system 106. The coolant heat exchange system 112 may include a coolant reservoir 112a for storing coolant in the fuel to coolant heat exchange system 112, a coolant pump 112b for pumping coolant in the fuel to coolant heat exchange system 112, and a fuel to coolant heat exchanger 112c for exchange heat between the returning fuel in the fuel back flow line 108a and the coolant in the fuel to coolant heat exchanger 112c. The coolant circulates in the fuel to coolant heat exchange system 112 for cooling the fuel. Although in this embodiment only one fuel to coolant heat exchange system is provided multiple fuel to coolant heat exchange systems may be provided. It is also possible to position one or more fuel to coolant heat exchange systems in the fuel distribution circuit. Although in this embodiment only one fuel to coolant heat exchange system is coupled to one air to coolant heat exchange system, in other embodiments other arrangements may provide adequate cooling of the fuel. For example, one fuel to coolant heat exchange system may be coupled to multiple air to coolant heat exchange systems, or multiple fuel to coolant heat exchange systems may be coupled to multiple air to coolant heat exchange systems, etc.

The air to coolant heat exchange system 114 may be coupled to the fuel to coolant heat exchange system 112. The air to coolant heat exchange system 114 may include an air to coolant heat exchanger 114a, vehicle ram air 114b, and a cooling fan 114c. The air to coolant heat exchanger 114a serves to exchange heat between air and the coolant. Airflow (as indicated by the dotted lines) may be used to cool the coolant. Airflow 114d may be created by the vehicle ram air 114b when vehicle is moving and/or airflow 114e may be created by an cooling fan 114c when the cooling fan 114c is turned on. As discussed previously in reference to the fuel to coolant heat exchange system of FIG. 1, in some embodiments, it may be possible to have other arrangements of the air to coolant heat exchange system. For example, several air to coolant heat exchange systems may be coupled to a fuel to coolant heat exchange system, etc.

The cooling fan 114c may is coupled to the engine and/or radiator, and may also circulate air through the radiator to cool engine coolant, as is in this embodiment, or it may be a separate fan. If the cooling fan adjusts flow through the radiator, the fan speed and operation may also be adjusted in response to engine temperature, such as based on engine coolant temperature, radiator temperature, etc.

The pressure sensors 118 are positioned in the low pressure line 104b and the common rail 106a of the common rail fuel injection system 106 for sensing fuel pressures at those locations. It is possible in other embodiments that no pressure sensor may be used, or multiple pressure sensors located at various positions may be included, and one or more other types of sensors, such as vehicle speed sensor, may also be included.

The temperature sensor 110 is positioned in the back flow fuel line 108a for sensing the fuel temperature of the returning fuel returning from the common rail fuel injection system 106. In this embodiment, the temperature sensor is coupled to the engine control unit 116. The temperature sensor may be positioned in other positions along the fuel path. Further, multiple temperature sensors located at various locations may be used. For example, the sensors may be positioned at various locations along the fuel path, at various locations along the coolant path, at various locations in the air to coolant heat exchange system, in the engine cylinders, etc. It is also possible in other embodiments for the temperature sensor to be physically disconnected from the engine control unit, for example, it is possible for the temperature sensor to communicate with the engine control unit via a wireless mean, such as infrared signal.

In this embodiment, only one pressure regulator 106d is positioned between the high pressure fuel line and the back flow fuel line 108a of the fuel recycling circuit 108; however it is possible to have several pressure regulators located at various positions of the fuel cooling system for regulating fuel pressure.

The engine control unit 116 is coupled to the temperature sensor 110, the coolant pump 112b, and the cooling fan 114c, the pressure regulator 106d and to various other sensors 120 and various other actuators 122 (e.g., low pressure fuel pump 104a, the high pressure fuel pump 106a, the pressure sensors 118, which are not all shown). It is possible in some embodiments that the engine control unit is coupled to various other pumps, sensors, controls, throttles, valves, etc. Although in this embodiment only one coolant pump and one cooling fan is provided, multiple coolant pumps and/or multiple cooling fans may be provided.

Figure 2:
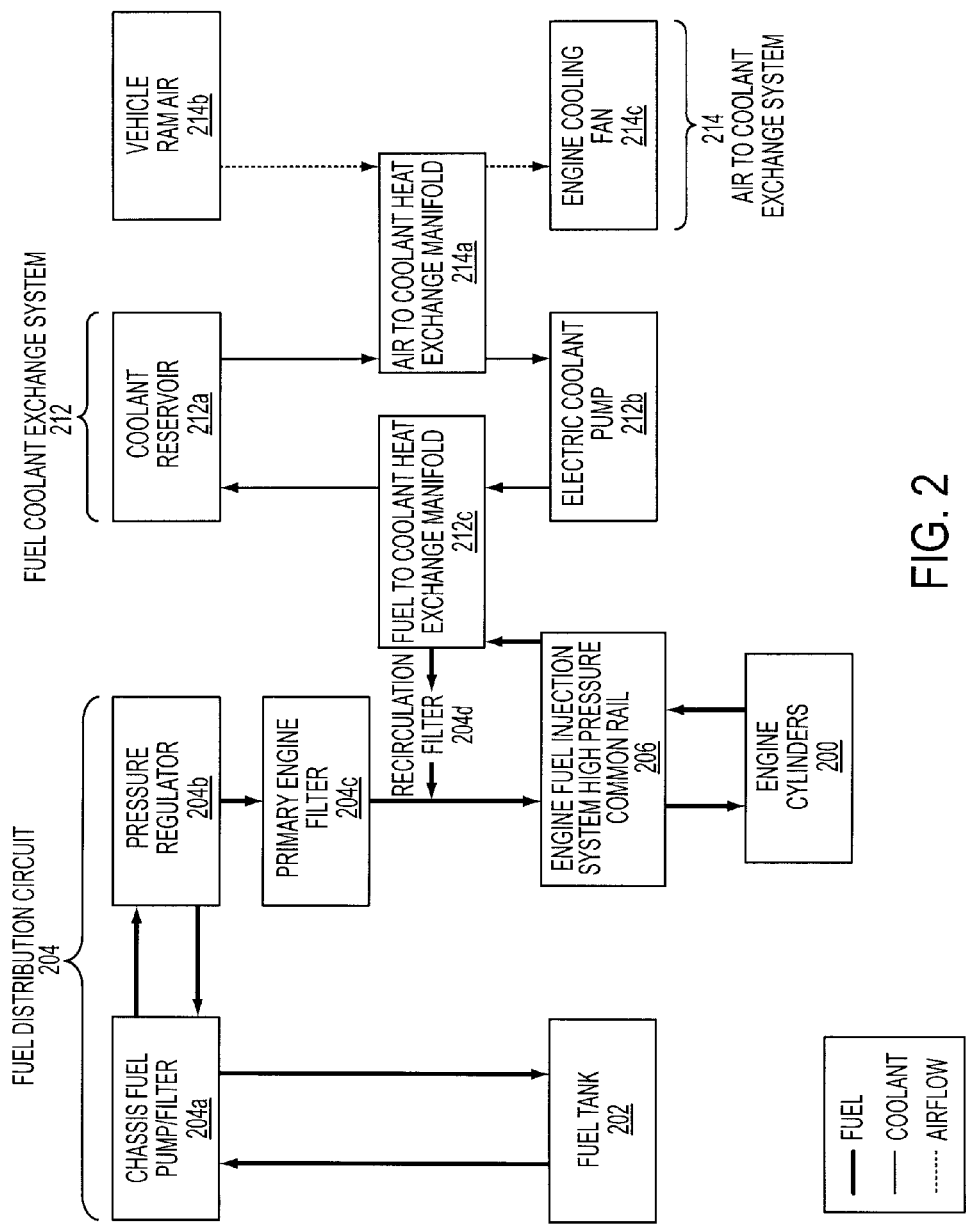
FIG. 2 is another system diagram of an example fuel cooing system.

FIG. 2 illustrates another example fuel cooling system for a diesel internal combustion engine system. The fuel cooling system may include a set of engine cylinders 200, a fuel storage tank 202 for storing fuel, a common rail fuel injection system 206, a fuel recycling circuit 208, temperature sensors 210, a fuel to coolant heat exchange system 212, an air to coolant heat exchange system 214, an engine control unit control unit 216, various sensors 220, and various actuators 222.

The fuel storage tank 202 has a first opening which provides a passage for fuel to flow into the fuel distribution circuit 204. It has a second opening which provides a passage for fuel to return from the fuel distribution circuit 204 under certain conditions.

The fuel distribution circuit 204 includes a chassis fuel pump/filter 204a for pumping fuel out of the fuel storage tank 202 and for pressurizing the fuel; a pressure regulator 204b for regulating the pressure of the pressurized fuel; a primary engine filter 204c for filtering the fuel prior to the fuel entering the common rail fuel injection system 206. It may also be possible in other examples for the fuel distribution circuit 204 to include various other pumps, filters, regulators, bypasses, valves, meters, sensors, controls, actuators etc.

The common rail fuel injection system 206 is coupled on one end to the fuel distribution circuit 204 and on a second end to the engine cylinders 200 and on a third end to the fuel recycling circuit 208. It is possible that the common rail fuel injection system 206 may include additional pressure and/or temperature sensors for sensing fuel pressure and temperature, and it may include additional pressure regulators for controlling the fuel pressure, and may include mechanisms for controlling fuel injection into the engine cylinders.

The fuel recycling circuit 208 is coupled on both ends to the common rail fuel injection system 206 and includes a recirculation filter 208a. On one end, the fuel recycling circuit 208 receives the un-injected fuel from the common rail fuel injection system 206; and on the other end, the fuel recycling circuit 208 recycles fuel back to the common rail fuel injection system 206.

The temperature sensors 210 are positioned in the path of the fuel recycling circuit 208 and in the fuel storage tank.

The fuel to coolant heat exchange system 212 is positioned in the path of the fuel recycling circuit 208 for cooling the un-injected fuel and it is coupled to and cooled by the air to coolant heat exchange system 214.

The air to coolant heat exchange system 214 is coupled to the fuel to coolant heat exchange system 212 for cooling the coolant in the fuel to coolant heat exchange system 212. The air to coolant heat exchange system 214 includes an air to coolant heat exchanger 214a, vehicle ram air 214b, and a cooling fan 214c. The air to coolant heat exchanger 214a serves to exchange heat between air and the coolant. Airflow (as indicated by the dotted lines) may be used to cool the coolant. Airflow 214d may be created by the vehicle ram air

214b when vehicle is moving and/or airflow 214e may be created by a cooling fan 214c when the cooling fan 214c is turned on.

The engine control unit 216 is coupled to the temperature sensors 210, the fuel to coolant heat exchange system 212, the air to coolant heat exchange system 214, and to various other sensors 220 and controls 222 (Not all shown).

The fuel in the storage tank 202 flows into the fuel distribution circuit 204, then into the common rail fuel injection system 206, and finally into the engine cylinders 200 to be injected. In addition, a passage is provided for fuel in the fuel distribution circuit 208 to flow back to the fuel storage tank 202. For example, when the engine is idling or is operating at a low speed so that the fuel delivered to the fuel distribution circuit 204 is excessive to engine requirements, the fuel is re-circulated back to the fuel storage tank 202 from the fuel distribution circuit 204 through a bypass, for example, a pressure regulator 204b (will be further described below) and/or a chassis fuel pump/filter 204a (will be further described below). The un-injected fuel of the common rail fuel injection system 206 is recycled back to the common rail fuel injection system 206 through the fuel recycling circuit 208, without first passing through the fuel storage tank 202. Although un-injected fuel does not flow from the common rail fuel injection system 206 back to the fuel storage tank 202, this may be possible in other embodiments, as illustrated in FIG. 1.

The various embodiments of the fuel cooling system as described in FIG. 1 and their advantages as discussed above in relation to FIG. 1 also apply here to FIG. 2.

Various modifications or adjustments may be made to the above example systems. For example, the fuel storage tank may have opening for receiving un-injected fuel from the common rail fuel injection system, and/or it may have an opening for receiving excess fuel back from the fuel distribution circuit. The fuel distribution circuit may include one or more temperature sensors, pressure sensors, and various other pumps, filters, bypasses, valves, meters, sensors, controls, actuators, etc. The fuel distribution circuit may include one or multiple lines. Further, the common rail fuel injection system may include one or more temperature sensors, pressure sensors, pressure regulators and various other pumps, filters, bypasses, valves, meters, sensors, controls, actuators, etc. Regarding the fuel recycling circuit, it may recycle the fuel back to the fuel storage tank and/or directly back to the common rail fuel injection system. The fuel recycling circuit may be coupled to one or more fuel to coolant heat exchange systems. The fuel recycling circuit may also contain one or more filters, pumps. The fuel recycling circuit may include one or multiple lines.

In one example, the cooling fan may be also be coupled to the engine radiator and used to circulate air through the radiator to cool engine coolant and/or the engine. Alternatively, the cooling fan may be a separate fan from the engine cooling fan and may be used to cool the coolant in the fuel to coolant heat exchange system without also cooling the engine or radiator/engine coolant. One or more fuel to coolant heat exchange systems may be provided. The fuel to coolant heat exchange system may be positioned in the fuel recycling circuit, and/or in the fuel distribution circuit, and/or in other locations along the fuel flow route. In addition, one or multiple fuel to coolant heat exchange systems may be provided. It may also be possible that one or multiple air to coolant heat exchange systems are coupled to a fuel to coolant heat exchange system.

The fuel cooling system may include no pressure sensor, one pressure sensor, or multiple pressure sensors. The pressure sensors may be located in various locations, such as in a common rail of the common rail fuel injection system, in the fuel tank, in a fuel injector, etc. The fuel cooling system may include one or more temperature sensors. The temperature sensors may be located at various locations for sensing temperature, such as in the fuel storage tank, in the fuel distribution circuit, in the common rail fuel injection system, in the fuel recycling circuit, etc.

The control unit may be an engine control unit or may be a unit separate from the engine control unit. It may be configured to send and receive information from various sensors, such as temperature sensors and pressure sensors. It may also be coupled to and control operation of various pumps, such as coolant pump, and various fans, such as engine cooling fan. It may be used to receive information from various other sensors, pumps, actuators and valves etc.

The specific routines described below in the flowcharts may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages of the example embodiments described herein, but is provided for ease of illustration and description. Although not explicitly illustrated, the illustrated acts or functions may be repeatedly performed depending on the particular strategy being used, during engine operation. Further, these figures may graphically represent code to be programmed into the computer readable storage medium in a controller or control system.

FIGS. 3-8 show high-level flowcharts of example routines for controlling fuel temperature that may be implemented in a vehicle control system, such as an engine control unit (ECU), or in a fuel cooling system, such as illustrated in FIGS. 1-2.

Figure 3:
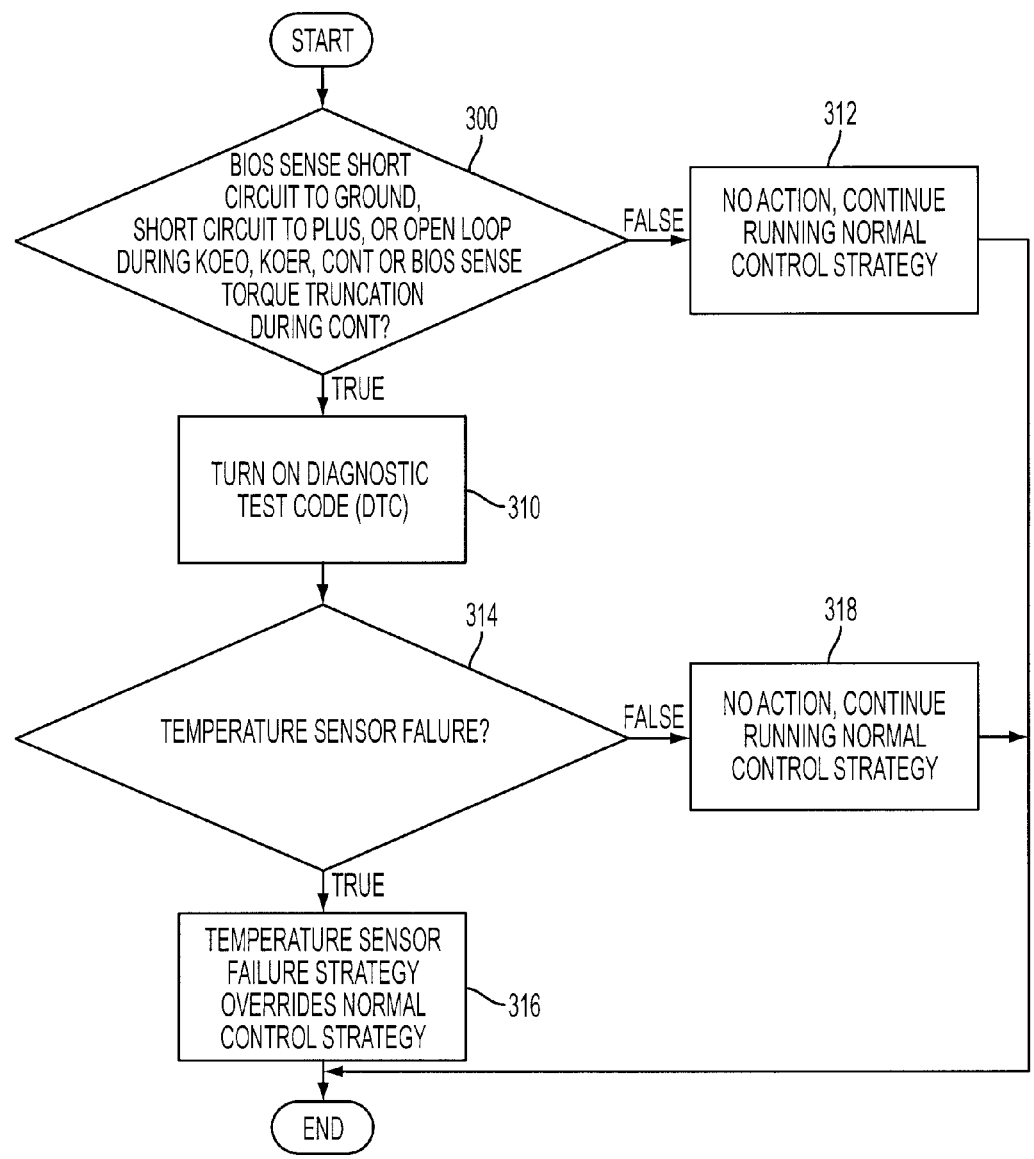
FIG. 3 is a flowchart illustrating selection of whether to run a temperature sensor degradation strategy or a normal control strategy.

FIG. 3 shows a high-level flowchart of an example routine 300 for selection of a temperature sensor degradation strategy or a normal control strategy for fuel temperature control. Specifically, the routine illustrates selection of the strategy for controlling the fuel temperature in a fuel cooling system. First, the engine control unit (ECU) runs the basic input/output system (BIOS) and determines whether there is any indication of temperature sensor degradation, such as but not limited to short circuit to ground, short circuit to plus, or open loop during various vehicle operating conditions, such as key-on-engine-on (KOEO), key-on-engine-running (KOER), or continued engine operation (CONT); or whether there is any engine torque truncation performed due to fuel temperature too HIGH in 308. If the ECU determines there is temperature sensor degradation, or engine torque truncation has occurred due to excessive fuel temperature, the ECU turns on a Diagnostic Test Code (DTC) in 310. On the other hand, if the ECU does not sense any indication of temperature sensor degradation or engine truncation, then the ECU performs no additional action and a normal control strategy for controlling the fuel temperature is continued in 312. After the ECU turns on the Diagnostic Test Code (DTC) in 310, the ECU determines whether there is temperature sensor degradation in 314. If ECU determines that there is temperature sensor degradation, the ECU overrides the normal control strategy for fuel temperature control and runs the temperature degradation strategy (See FIGS. 6-7) for fuel temperature control in 316. On the other hand, if ECU determines that there is no temperature sensor degradation, the ECU performs no additional action and the normal control strategy (See FIGS. 4-5) for fuel temperature control is continued in 318.

Figure 4:
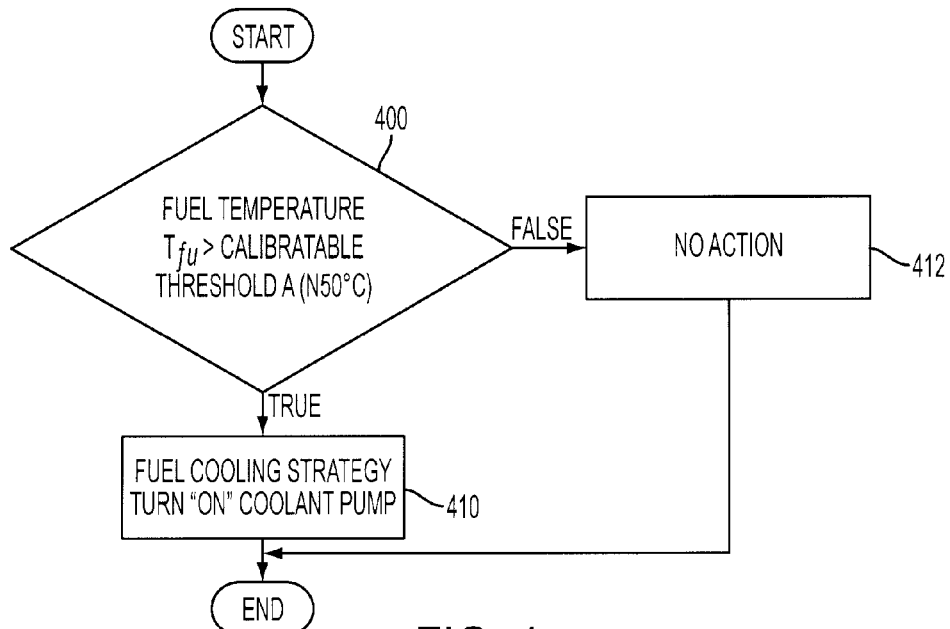
FIG. 4 is a flowchart showing a coolant pump control strategy.

FIG. 4 shows a high-level flowchart of an example routine for a normal coolant pump control strategy. First, the engine control unit determines whether the fuel temperature TFU is greater than a calibratable threshold A (e.g., around 50° C.) in 400. If the engine control unit determines that TFU is greater than the threshold A, then the engine control unit turns on coolant pump in 410. On the other hand, if the engine control unit determines that TFU is not greater than the threshold A, then the engine control unit performs no additional action in 412 (or decreases the engine speed or torque).

Figure 5:
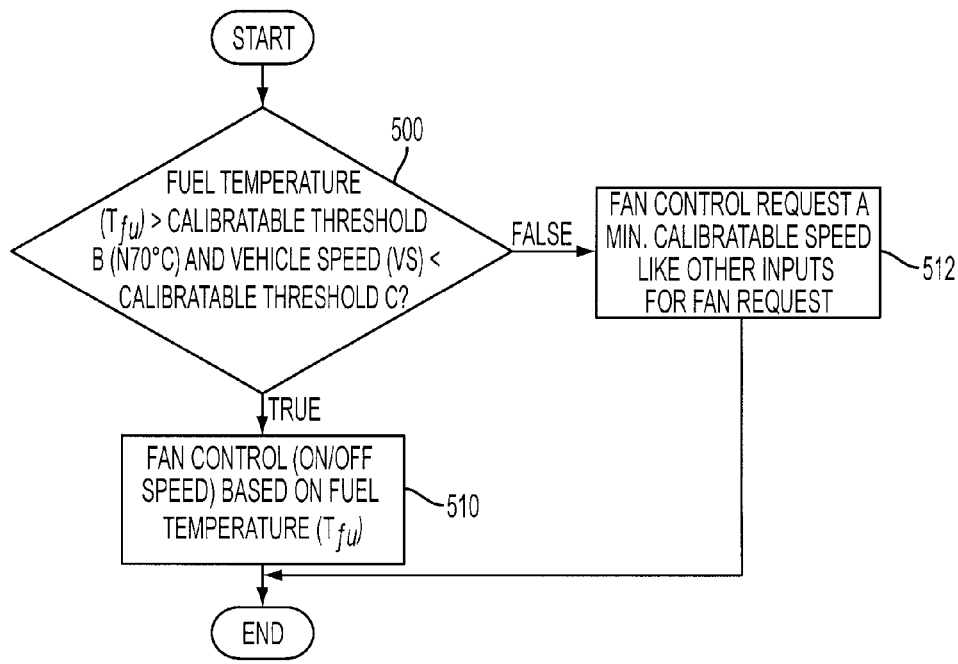
FIG. 5 is a flowchart showing a engine fan control strategy.
Figure 6:
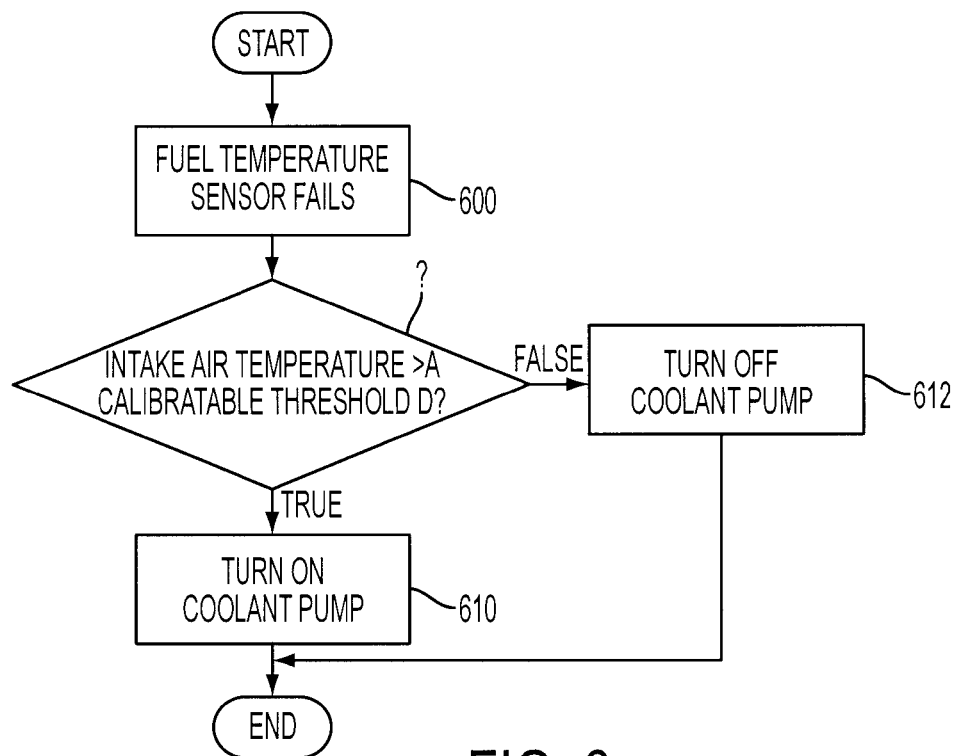
FIG. 6 is a flowchart showing a temperature sensor degradation strategy for controlling a coolant pump.

FIG. 5 shows a high-level flowchart of an example routine for running a normal engine cooling fan control strategy. First, the engine control unit determines whether the fuel temperature TFU is both greater than a calibratable threshold B (e.g., around 70° C.) and the vehicle speed (VS) is less than a calibratable threshold C in 500. If the engine control unit determines that both TFU is greater than the threshold B and VS is less than the threshold C, then the engine control unit controls the engine cooling fan based on TFU. For example, it may turn on or increase fan speed when TFU is greater than desired, and may turn off or decrease fan speed when TFU is less than desired. On the other hand, if the engine control unit determines that it is not true that both TFU is greater than the threshold B and VS is less than the threshold C, either because TFU is not greater than threshold B or because VS is not less than threshold C, then the engine control unit requests a minimum calibratable fan speed. For example, the minimum fan speed may be a calibratable minimum fan speed based on engine speed, FIG. 6 is a high-level flowchart showing an example routine for running a temperature sensor degradation strategy for controlling the coolant pump. Specifically, the ECU determines if both the fuel temperature sensor has degraded (e.g., through a routine as illustrated in FIG. 3) and the intake air temperature is greater than a calibratable threshold D in 600. If both the fuel temperature sensor has failed and the intake air temperature is greater than a calibratable threshold D, then the ECU turns on the coolant pump (or increases speed or torque of the coolant pump) in 610. Otherwise, if it is not true that both the fuel temperature sensor has degraded and the intake air temperature is greater than a calibratable threshold D, either because there is no temperature sensor degradation or because the intake air temperature is not greater than threshold D, then the ECU turns off the coolant pump (or decreases speed or torque of the coolant pump in 612

Figure 7:
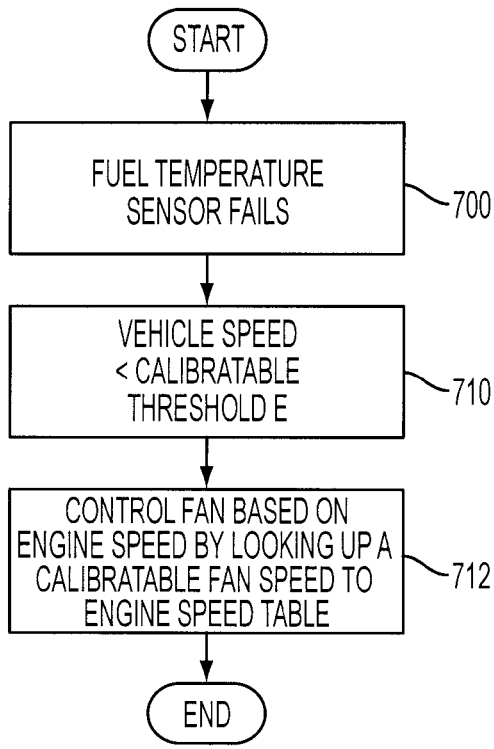
FIG. 7 is a flowchart showing a temperature sensor degradation strategy for controlling a cooling fan.

FIG. 7 is a high-level flowchart showing an example routine for a temperature sensor degradation strategy for controlling the engine cooling fan. Specifically, the ECU determines if both the fuel temperature sensor has degraded (e.g., through a routine as illustrated in FIG. 3) and the vehicle speed (VS) is less than a calibratable threshold E in 700. If both the fuel temperature sensor has failed and the VS is less than a calibratable threshold E, then the ECU controls the engine cooling fan based on engine speed by looking up a calibratable fan speed to engine speed table in 712. Otherwise, when either there is no fuel temperature sensor degradation or the VS is not less than the calibratable threshold E, then the ECU performs no action in 714.

If the fuel temperature sensor has degraded, the strategy infers the fuel temperature based on the inlet air temperature to determine whether to turn ON/OFF the coolant pump. The viscous fan provides additional cooling if the fuel temperature continues to rise with the coolant pump ON.

Figure 8:
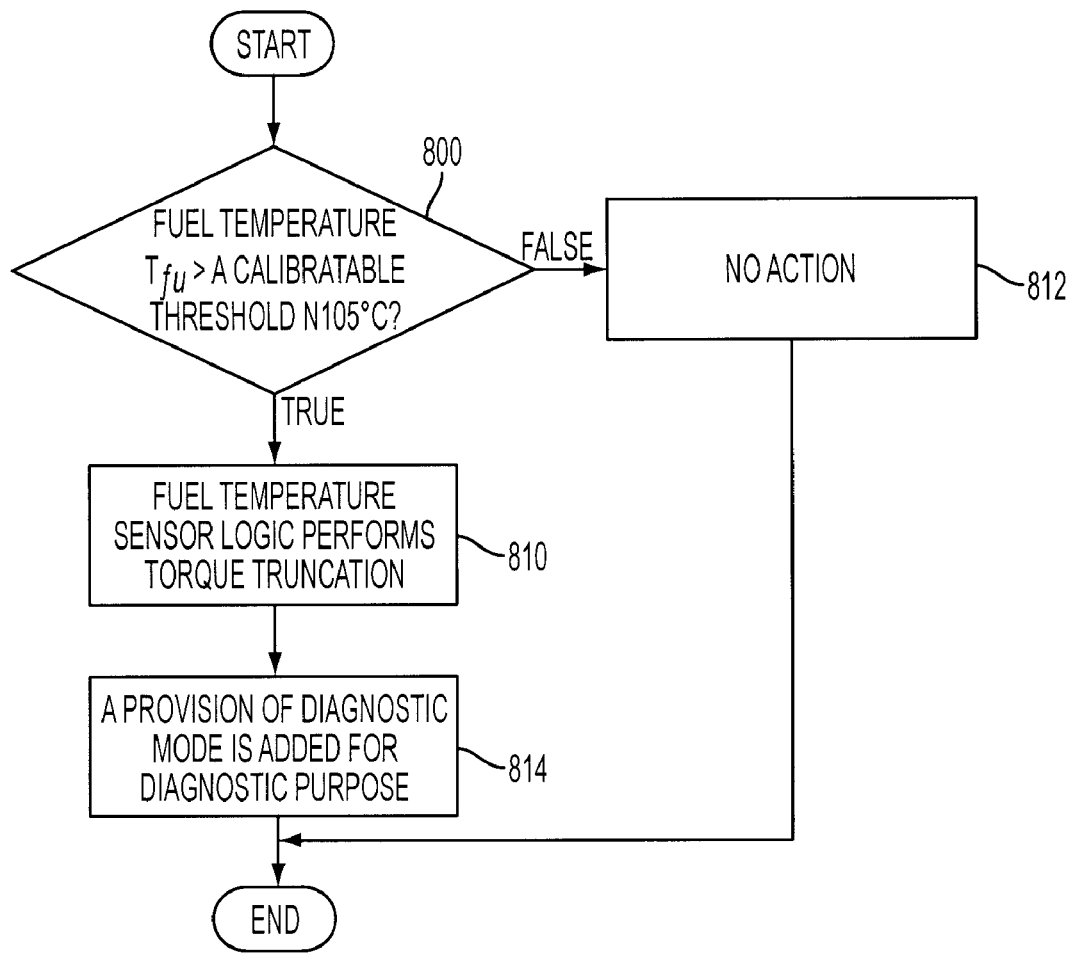
FIG. 8 is a flowchart showing a torque truncation operation.

FIG. 8 is a flowchart showing an example routine for performing a torque truncation operation. Specifically, the engine control unit (ECU) determines whether the fuel temperature TFU is greater than a calibratable temperature threshold F (e.g., around 70° C.) in 800. If TFU is greater than threshold F, then the ECU performs an engine torque truncation, for example through a fuel temperature sensor logic in 810. Otherwise, if TFU is not greater than threshold F, then the ECU performs no additional action in 812. If ECU performs an engine torque truncation in 810, the ECU then runs the diagnostic test code for the temperature sensors in 814. The engine torque may be truncated in a plurality of ways, such as reducing an amount of fuel injection, changing (e.g., delaying) injection timing, increasing throttling, and various others.

By providing a mechanism to independently control the coolant pump and the engine cooling fan, the fuel cooling system may have more latitude to more precisely control fuel temperature for particular operating conditions. For example, when the fuel temperature is above a certain calibratable threshold A, for example above around 50° C., the engine control unit adjusts the coolant pump. When both the fuel temperature is above another calibratable threshold B, for example above around 70° C., and the vehicle speed is less than a calibratable threshold C, the engine control unit controls the engine cooling fan based on the fuel temperature. Otherwise, the engine control unit controls the engine cooling fan to a min calibratable speed. Further, by providing a mechanism for performing engine torque truncation when the fuel temperature is excessively high, for example at above 105° C., the fuel cooling system may be able to further control the returning fuel temperature. Finally, by providing a fuel temperature sensor degradation strategy in addition to a normal strategy, the fuel cooling system may still provide necessary cooling when the fuel temperature sensor degrades. And, by providing a diagnostic code for the fuel temperature sensor, the fuel cooling system may be able to timely detect any degradation of the fuel temperature sensor and run the fuel temperature sensor degradation strategy The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A fuel cooling system for a diesel internal combustion engine system having a set of engine cylinders, a fuel storage tank, and a common rail fuel injection system comprises:
  a fuel distribution circuit for carrying fuel from the fuel storage tank to the engine cylinders;
  a fuel recycling circuit for recycling un-injected fuel;
  a temperature sensor for sensing fuel temperature;
  a fuel to coolant heat exchange system for cooling the fuel wherein the fuel to coolant heat exchange system comprises a coolant reservoir, an electric coolant pump, and a heat exchange manifold;
  a mechanism for controlling the electric coolant pump operation;
  an air to coolant heat exchange system coupled to the fuel to coolant heat exchange system for cooling the coolant in the fuel to coolant heat exchange system wherein the air to coolant heat exchange system is exposed to vehicle ram air and includes a heat exchange manifold and a cooling fan; and a mechanism for controlling the cooling fan.

2. A fuel cooling system according to claim 1 wherein the control mechanism for controlling the cooling adjusts speed of the cooling fan.

3. A fuel cooling system according to claim 1 wherein the cooling fan is an engine cooling fan coupled to an engine radiator for cooling engine coolant.

4. A fuel cooling system according to claim 1 further comprising a plurality of temperature sensors at multiple locations along a fuel flow path.

5. A fuel cooling system according to claim 1 further comprising a pressure regulator regulating fuel pressure.

6. A fuel cooling system according to claim 5 wherein the pressure regulator provides directs fuel from a high pressure fuel line to a back flow fuel line of the recycling fuel circuit.

7. A fuel cooling system according to claim 1 wherein the fuel recycling circuit recycles un-injected fuel back to the fuel storage tank.

8. A fuel cooling system according to claim 1 wherein the fuel recycling circuit recycles un-injected fuel back to the common rail fuel injection system without first passing through the fuel storage tank.

9. A fuel cooling system according to claim 1 wherein the fuel to coolant heat exchange system is positioned in the route of un-injected fuel returning from the common rail fuel injection system.

* * * * *